April 13, 1965   F. BOWMAN   3,177,864
FOLDABLE GRILL
Filed March 11, 1963   2 Sheets-Sheet 1
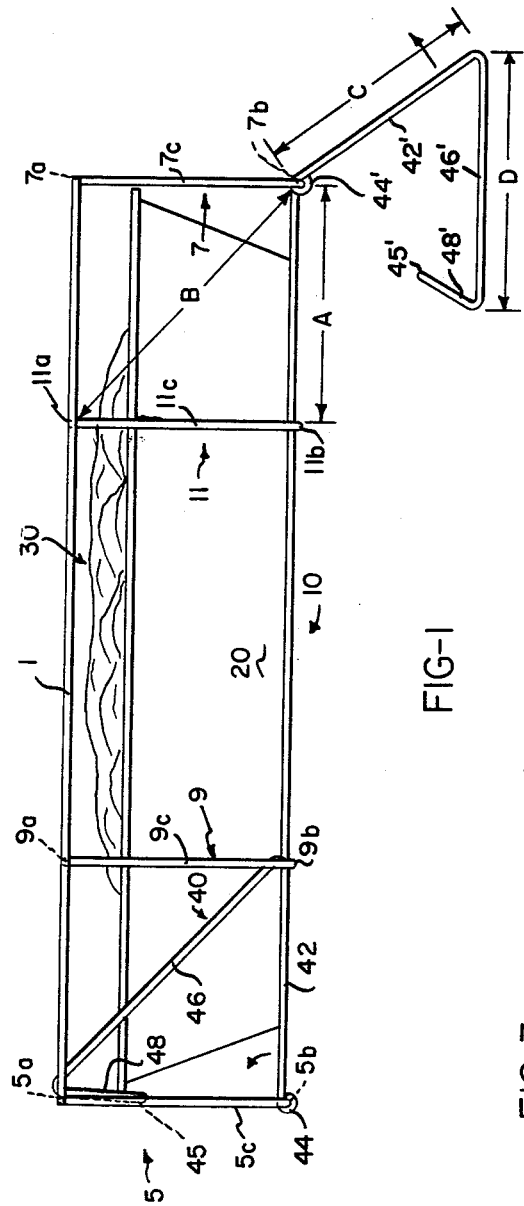
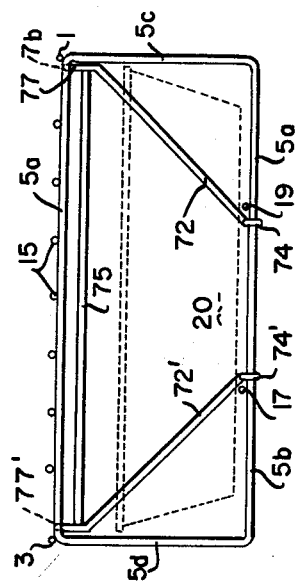
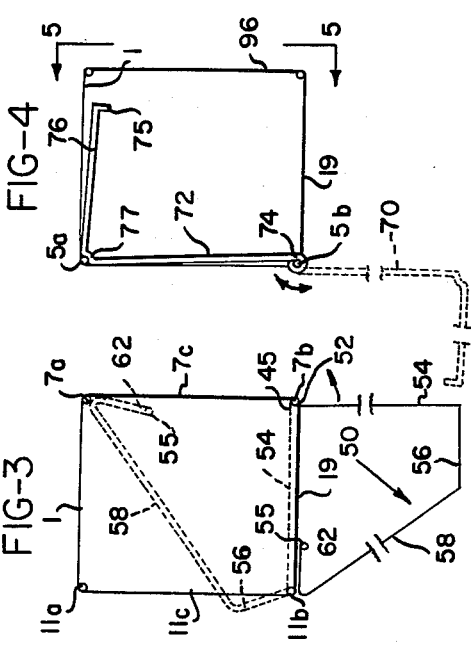
INVENTOR.
FRED BOWMAN
BY
*Smith, Michael & Gardiner*
ATTORNEYS

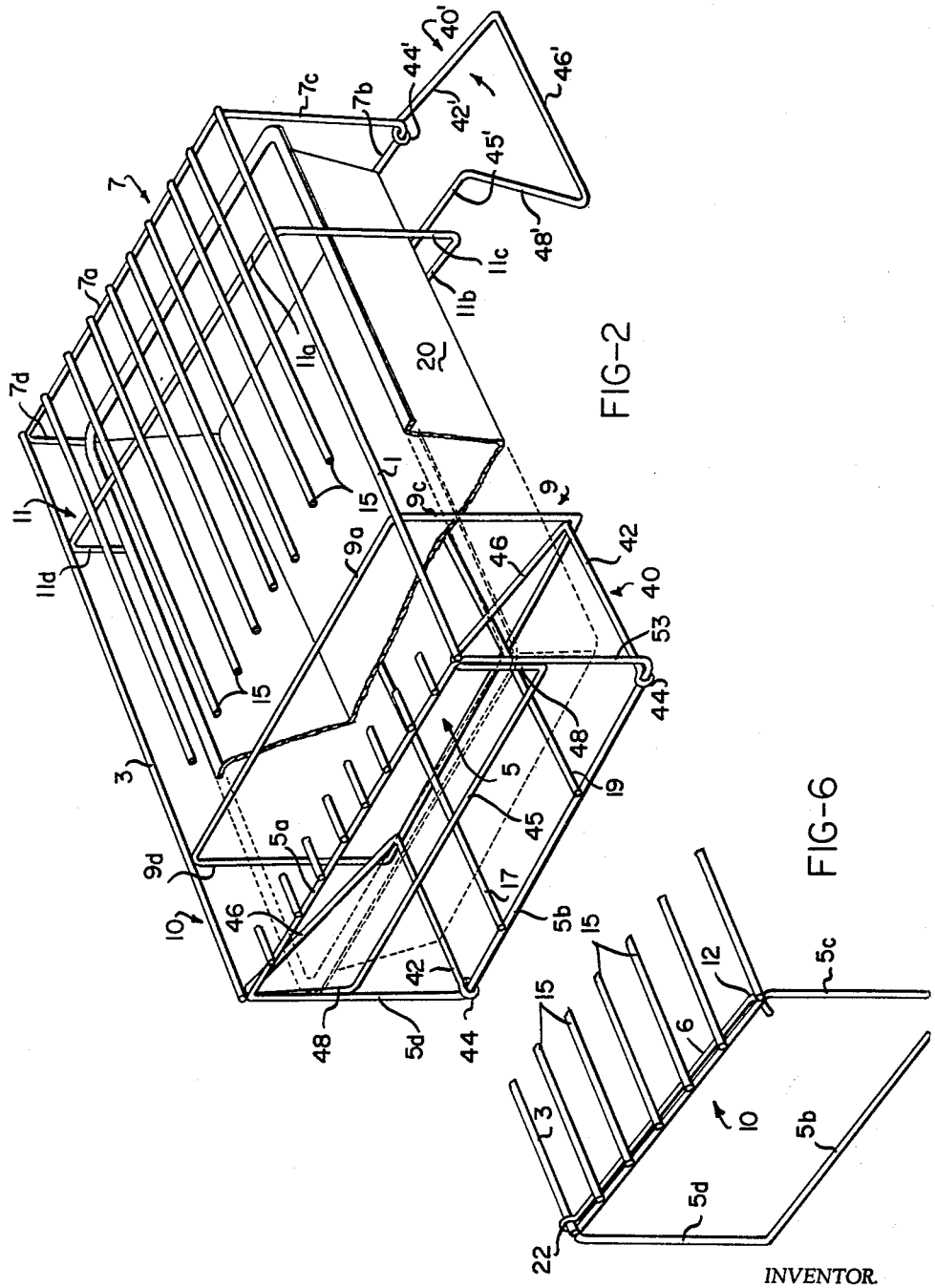

United States Patent Office 3,177,864
Patented Apr. 13, 1965

3,177,864
FOLDABLE GRILL
Fred Bowman, P.O. Box 350, Rte. 3, De Land, Fla.
Filed Mar. 11, 1963, Ser. No. 264,150
11 Claims. (Cl. 126—9)

This invention relates to portable cook stoves. More particularly the invention is concerned with a portable charcoal grill which may be sold initially in package form and which may be reused time and time again, with the parts most susceptible of loss or destruction, being readily replaceable.

The particular environment for the present invention is amply illustrated by U.S. Patents 2,122,275 and 2,981,249 among others relating to grill structures and over which this present invention is a marked improvement. Each of the mentioned patents deals with a portable grill.

Patent 2,122,275 is representative of a foldable or "knockdown" grill structure, while Patent 2,981,249 is illustrative of a grill structure particularly adapted to economical manufacture and for sale in "package" form. By "package" form is mean that the grill including the firing means, in this case charcoal, is sold as a unit, a single package.

The present invention provides a unique structure which not only is conveniently folded or unfolded to a use and non-use condition, but also is particularly adapted to be sold and thereafter transported between each use in a convenient package form. In addition, the present invention is practically indestructible, having a minimum of parts, particularly moving parts, and the most likely part to be destroyed intentionally or otherwise, is readily available in quantity, on the open market and at a minimum of cost.

Accordingly an object of the invention is to produce a unique "package" grill.

A further object of the invention is to produce a grill of simple construction, yet which is exceptionally convenient to use.

Another object of the invention is to produce a grill structure having few parts susceptible of loss or breakage and one in which the only expendable part is readily purchased on the open market.

A further object of the invention is to produce a grill which may be used practically everywhere and anywhere, indoors, such as in a home, or boat, or out-of-doors on the ground, and even on a table with little or no risk or heat damage.

Still another object of the invention is to produce a portable gril which is exceptionally convenient to use and readily transported when folded.

These and other objects of the invention not specifically referred to, but, none-the-less inherent in the invention are accomplished by providing the combination of a generally hollow cubiform cage-like frame having four closed i.e., barred sides and two opposite open ends one of said closed sides defining a top grate-like cooking surface, the opposite side thereto forming a fire pan support, a closed fire pan resting on said bottom of said frame and legs pivotally connected to the edges of said frame at the bottom thereof and having at least one portion engageable with the top of the frame, said legs being swingable from a position beneath the frame, to support same in spaced relation above a given surface, to a position overlying and closing the opposite open ends of the cubiform frame in releasably locked engagement with the top of the frame to retain the fire pan emplaced on the fire pan supporting bottom when the frame is transported from place to place. Preferably, the basic cage-like frame structure is formed of corrosion-resistant, easily cleaned, wire rods or strands suitably formed and brazed together; the fire pan being in the form of a shallow, dish-shaped aluminum foil pan dimensioned to be slidably inserted and to fit snugly but removably within the hollow interior of the frame. Generally, as sold, the pan is filled with a predetermined amount of bagged, self-lighting, spark-inhibited charcoal such that the unit may be used by simply unfolding the legs to their supporting position and applying a source of flame to the bagged fuel.

In describing the invention in detail reference will be made, hereinafter, to the drawings appended hereto and forming a part of the specification hereof, wherein:

FIGURE 1 is a side elevational view of a preferred form of the invention.

FIGURE 2 is a perspective view of the invention in the form similar to FIGURE 1.

FIGURE 3 is a partial schematic view showing a modification of the invention.

FIGURES 4 and 5 are partial schematic and end views respectively showing a further modification.

FIGURE 6 is a partial perspective view, similar to FIGURE 2, showing a further modification.

Referring now, in particular, to FIGURES 1 and 2 it will be obvious that the cage-like frame 10 is generally in the form of a cube, hence cubiform, and includes a bottom, top and sides all of generally rectangular form and ends which are also rectangular in form. The ends of the frame are completely open and unobstructed while the top, bottom and sides are "barred," that is certain of the wire rods or strands of which the frame 10 is fabricated, extend between the edges of the frame for each particular side, bottom and top respectively.

Thus the marginal edges of the top of frame are defined by wire strands or rods 1 and 3 respectively and the top strands 5a and 7a of a pair of generally rectangular, vertically positioned tie members 5 and 7 respectively.

Extending in parallel relation to each other and the edge strands 1 and 3 and lying in a common plane are a plurality of further rod members 15. These rod members are equally spaced apart and define a grid-like upper surface upon which the foodstuff to be cooked or warmed may be placed when the grill is in use.

The bottom strands 5b and 7b of the respective tie members 5 and 7 are in turn interconnected by a pair of parallel, co-planar pan support rods 17 and 19 which are suitably affixed to the tie members 5 and 7. The support rods 17 and 19 are positioned so as to be symmetrical about the longer arcs of the bottom of frame 10.

Spaced inwardly an equal distance from each end of frame 10 are a further pair of tie members 9 and 11, configured so as to duplicate tie members 5 and 7 and having top, bottom and side strands 9a, b, c and d and 11a, b, c and d, respectively, disposed in co-planar relation with the equivalent strands of tie members 7 and 9. The members 9 and 11 are also fixed to the grid bars 15 and lower pan supports 17 and 19 in a fashion duplicating that of members 7 and 9. The vertical and parallel side strand portions 9b and 9c and 11b and 11c of tie members 9 and 11 serve to close or "bar" the vertical sides of the frame and, along with grid bars 15 and pan supports 17 and 19, serve to retain fire pan 20 confined within the cubiform frame or cage 10 such that the pan can only be removed via the open ends thereof.

The fire pan 20 is of conventional design and fabricated of aluminum foil of such thickness as to be completely self-sustaining yet readily folded or crushed for disposal purposes. Preferably the foil is full hard, as distinguished from annealed, foil. Pans of the type in question are manufactured by a number of concerns, one in particular being the Ekco-Alcoa Company, and are sold primarily as general purpose food containers and the like. They are available through various retail outlets such as hardware stores, food stores, etc., and are thus readily available to the public.

Because the ends of the frame 10 are open, as is now readily apparent, the fire pan 20 may easily be inserted into the interior of the frame 10 by a sliding motion such that the bottom of the pan 20 rests on the pan supports 17 and 19 and its open top is spaced slightly below the cooking surface defined by the grate rods 15.

As is believed readily apparent, the plan dimensions of the pan 20, i.e., length and width, and the frame 10 are complementary such that the pan 20 will slide readily into the interior of the frame and will substantially lie beneath the entire cooking surface.

As the unit is initially supplied to a purchaser and user, the pan 20 contains a bag of charcoal of sufficient quantity to maintain a cooking fire of approximately two hours duration. Preferably the charcoal is supplied in an inflammable bag, such as cellophane or the like, and is of the self-igniting type. One particular charcoal suitable for use in the invention is a self-igniting, sparkless charcoal manufactured by the Sherwood Corporation of Florida. This product marked under the name "Fire Fab" has been approved for use, by various safety institutions, in home grills and in confined spaces where the use of ordinary charcoal would be considered dangerous due to sparking or emission of embers.

While each bag of charcoal will produce about two hours of cooking, it will be appreciated that the supply may be varied, as desired, to provide for shorter cooking times as may be desired. Additionally the cooking time may be extended by the addition of more fuel. Too, the size of the particular fire pan 20 and the overall frame structure 10 will also dictate to some extent the cooking times involved, since both of these items may be varied in size as may be desirable, so long as the pan 20 underlies substantially all of the cooking surface both to heat the grate area in its entirety; dissipate the heat beneath the frame 10 and, further, to collect all drippings which would otherwise fall on the ground, table top or the like.

For the dual purpose of both closing the otherwise open ends of the cubiform frame 10 and, also, to support the frame 10 and fire pan 20 above any surface upon which the structure may be used, the cubiform frame is provided at its ends with vertically swingable leg structures 30 and 40 respectively. Each leg is formed of a single wire rod or strand bent into suitable form as will now be described.

FIGURES 1 and 2 illustrate a preferred form of the invention the initial leg structure will be described in terms of these two figures.

As seen in FIGURE 1, two identical, mirror image leg structures 40 and 40' are provided at either end of the cruciform frame 10. Each leg, therefore, comprises a pair of pivot arms 42, 42' which are connected to the lower strands 5b and 7b respectively of tie members 5 and 7 respectively by simple loop connectors 44, 44' respectively, at their upper ends. The pivot arms 42, 42', respectively, terminate at their lower ends in co-planar foot portions 46, 46'. The ends 48, 48' of each foot portion 46, 46', respectively, remote from the pivot arms 42, 42', define what may be called reentrant portions, turned at an angle to the foot portions in a direction toward the pivot connections 44, 44'. These reentrant portions of each leg are connected together by a transverse bail member 45, 45', respectively.

As viewed in FIGURE 1 in vertical elevation, it may be seen that the pivot arms 42, 42', the foot portions thereof 46 and 46' and the upturned reentrant portions thereof, which connect to bail members 45 and 45' are generally configured so as to approximate an equilateral triangle or arc of generally the shape of the Greek letter "delta."

In FIGURE 1, the horizontal distance between tie members 7 and 11 is represented by the letter A; the diagonal distance between horizontal strands 7b, 11a of tie members 7 and 11 as B. Also, the length of the pivot arm 42' is illustrated by the letter C; while that of the foot portion 46' of leg 40' is represented by the letter D.

For ease of description then it will be noted that the length C of the pivot arm 42' is slightly greater than the distance A between tie members 7 and 11, while the length D of the foot portion 46' is slightly greater than the diagonal distance B between the lower strand 7b of tie member 7 and the upper strand member 11a of tie member 11. The purpose of this corelation between distances A, B, C, etc., will become apparent.

Thus the leg 40', as shown in FIGURE 1, also FIGURE 2, will, when pivoted beneath the frame 10, assume the position shown in the drawing, supporting the frame 10, fire pan 20 and contents a safe distance above a supporting surface, whatever it may be. The leg 40 will assume a similar position when unfolded so that the frame is very stably supported for placement on a given surface.

However, as shown in the drawings, the leg 40 is in folded position. Thus the swingable pivot arms 42 lie within the marginal edges of the frame 10 and their free, i.e., unconnected ends, rest on the bottom strand 9b of tie member 9. Because the foot portion 48, is slightly longer than the diagonal distance between bottom strand 9b of tie member 9 and the top strand 5a of the end tie member 5, it will be seen that the reentrant portion 48, of the leg 40 will engage the top strand 5a. Since the leg 40 is fabricated of metal rod and hence, is bendably resilient, the foot portion 46, of the leg 40 may flex under pressure and hence the leg may be snapped by flexure of the foot portion 46, into a locked folded position within frame 10, bearing against the top strand of end tie member 5 and the lower strand tie member 9. Since the reentrant portion 48 of the leg is interconnected by transverse bail member 45, this bail member may serve a dual function. First, the bail member, as is apparent in FIGURE 2, will close, i.e., bar the open end of frame 10 preventing dislodgement of pan 20 regardless of the position of the grill assembly, and, secondly, the bail 45 comprises a convenient means for locking and unlocking the leg 40 into and out of its folded position.

Since the foot portion of the leg 40 will flex, it will be seen that downward pressure, usually simple finger pressure, on bail 45 will result in such flexure so that the joints formed between foot portion 46 and the reentrant portion 48 of the leg 40 will snap under the top strand 5a of end tie member 5 thus allowing leg 40 to be locked as shown or unlocked and swung to supporting position as the leg 40' is shown in the drawings.

It will be appreciated of course that leg 40' and parts 42', 46' and 48' along with bail 45' act in similar fashion, cooperating with end tie 7 so that it, too, may be swung to locked, pan retaining position, or unlocked to swing into the position shown in the drawing.

With the legs 40 and 40' locked into folded position, it will be obvious that the entire grill assembly may be readily picked up, carried in any position, and that for purposes of initial sales since the "package," i.e., frame 10, pan 20 and charcoal 30, is in the form of a cube, it may be readily boxed, stocked and otherwise handled, as in conventional practice, without loss of parts or requiring an inordinate use of space as is the case in many prior art devices.

During use, the assembly permits of maximum convenience, renewal of fuel and, of course, fire pan 20 may be discarded at any time and easily replaced. There are a minimum of parts and those parts which are moveable can be moved with a maximum of ease and convenience.

It will be immediately discerned that modifications of the structure may be made, which modifications will in no way detract from the inventive concept and representative modifications are shown in FIGURES 3, 4, 5 and 6, in at least partially schematic form.

Turning first to FIGURE 3, a modification of a leg structure is shown, the right hand end of frame 10 being shown in outline form. In this modification the leg 50 is pivotally connected at 52 to bottom strand 7b of end tie member 7. The pivot arm 54 extends downward generally vertically at right angles to the frame 10. The foot portion 56 of leg 50 is bent at a right angle to the pivot arm and is connected to a diagonal support portion 58 which extends upwardly toward frame 10 terminating in a reentrant portion 62 which parallels pan support rods 19 and 17. Bail 55 extends between the terminal ends of the reentrant portions 62 and 62' (not shown). The bail member 55 thus extends transverse to the pan support rods 17 and 19 and rests thereagainst when leg 50 is in unfolded supporting position.

As shown in dotted line outline leg 50 folds and locks in the self-same fashion as legs 40 and 40' and serves precisely the same function, when folded as do these legs.

FIGURES 4 and 5 illustrate a further modification wherein leg 70 is shown attached to the left hand side of frame 10. In this case the pivot arms 72, 72' are connected to the bottom strand 5b of end tie member 5 by loop connections 74, 74'. These connections are disposed inwardly between pan supports 17 and 19 and then diverge outwardly toward the top edges of frame 10 to form foot portions 76, 76' spaced apart a distance approximately equal to the width of frame 10. The terminal ends of the foot portions 76, 76' are in turn interconnected by transverse bail 75 disposed above pan 20.

At the juncture between pivot arms 72, 72' and foot portions 76, 76' notches 77, 77' are formed to engage and lock under the top strand 5a of end tie member 5. Obviously the length of the pivot arm 72 is slightly greater than the vertical distance between top and bottom strands 5a and 5b of the end frame 5.

Downward pressure on bail 75 (accessible between grate bars 15) causes flexure of support arms 72 to unlock the leg and permit same to unfold. The diverging pivot arms 72 block or bar the ends of frame 10 when leg 70 is locked in folded position.

Turning now to FIGURE 6 a modification of frame 10 is shown whereby the cooking surface is swingably mounted. In this instance end frame 5 is unchanged as are side bars 1 and 3. Instead of fixing grate bars 15 to the top of end tie member 5 (also 7, 9 and 11) the grate bars 15 are connected to grate support arms 6 and 6' (the latter not shown). This support arm 6 is pivotally connected at 22 by a simple loop connection to the bar 3. The opposite end of grate support bar 6 is bent at an angle at 12 to form a snap lock abutment which will snap under side bar 1. The ends of grate bars 15 extend outwardly to overlie the top strand 5a of end frame 5 and thus the grate surface is locked in a level position. Flexure of the grate support bars 6, 6' will permit the abutment at 12 to snap out from beneath the side bar 1 to permit the cooking surface to be swung vertically upwardly. Obviously, this arrangement will facilitate refueling of pan 20 without the necessity of having to slide the hot pan endwise from beneath the grate bars 15.

It will be appreciated that throughout the specification references to vertical and horizontal are made for descriptive purposes, such references being established by considering the structure as shown in normal use position, illustrated in FIGURE 1.

Having described my invention in detail it will be obvious to those skilled in the art that modifications and changes therein may be made which fall within the spirit and scope of the invention which is limited only as defined in the following claims, wherein what is claimed is:

1. A portable grill structure comprising, in combination, a generally hollow, cubiform frame having four closed sides and opposite open ends, one side of said frame comprising a top cooking surface, the opposite side thereto defining a bottom fire pan supporting surface; a fire pan disposed within the frame and slidable with respect thereto into and out of the open ends thereof; swingable leg means connected to the ends of the frame at the ends of the fire pan supporting bottom thereof, said legs being swingable from a position supporting said frame above a resting surface, when swung downward beneath the frame, to a position overlying and blocking the ends of the frame in releasably locked relation therewith to retain said fire pan emplaced within the frame regardless of the non-use position of the grill structure, each of said leg means being fabricated from bendable, but limitedly resilient rod stock.

2. A grill structure as defined in claim 1, wherein said frame is fabricated of bendable, limitedly resilient rod members.

3. A grill structure as defined in claim 1 wherein said fire pan is fabricated of a light metal foil.

4. A portable grill structure as defined in claim 1, wherein each of said swingable leg means comprises a pair of pivot arm means connected to the bottom edge of the frame, base means connected to the pivot arm means and a bail member extending between said base means whereby when each of said leg means is swung into releasably locked relation with the frame, said bail member will bar the open ends of the frame to retain said fire pan emplaced within the frame.

5. A portable grill structure as defined in claim 1 wherein said swingable leg means includes pivot arm means connected to the bottom edge of the frame adjacent the center thereof and diverging outwardly toward the outer marginal edges of the frame.

6. A portable grill structure comprising in combination a cubiform frame having open ends and closed bottom, top and sides; a fire pan disposed within the frame and resting on the bottom thereof; swingable leg means moveable from a support position beneath the frame to a locked position within the frame, said leg means including bail means closing the ends of the frame in the latter position, said frame being formed of resilient, but bendably deformable, rod members to include a top grilling surface; a pair of generally rectangular vertically disposed end tie members connecting the grilling surface to the bottom of the frame; a further pair of identical tie members disposed inwardly of said end tie members, said end tie members and said further tie members supporting said swingable leg means in locked position within the frame.

7. A portable grill structure as defined in claim 6 wherein said frame top includes a pair of spaced parallel edge defining rods permanently affixed to the upper corners of the top of each rectangular tie member and said grilling surface is comprised of spaced, parallel bar members rigidly connected to a pair of support rods, said rods lying transverse to said spaced, parallel bar members and being pivotally connected to one of said edge defining bars and releasably connected to the other of said edge-defining bars to permit said grilling surface to be swung vertically.

8. A portable grill structure as defined in claim 6 wherein each of said swingable legs is locked within the frame by releasable contact of a portion thereof with the top strand of each of said rectangular end tie members.

9. A portable grill structure as defined in claim 8 wherein a portion of each leg rests against the bottom strand of said further, generally rectangular tie member.

10. A portable grill structure as defined in claim 9 wherein the space between each end tie member and each further tie member, measured from the ends of the frame, is identical and said legs include pivot arm means having a length greater than the space between said end tie members and each of said further tie members.

11. A portable grill structure as defined in claim 7 wherein said fire pan is comprised of a light-metal foil.

References Cited by the Examiner
UNITED STATES PATENTS

| | | | |
|---|---|---|---|
| 1,544,651 | 7/25 | Klinert. | |
| 2,477,529 | 7/49 | Sprinkle et al. | 126—9 |
| 2,673,003 | 3/54 | Stewart | 126—9 |
| 2,965,096 | 12/60 | Barton | 126—25 |
| 2,981,249 | 4/61 | Russell et al. | 126—25 |
| 2,994,315 | 8/61 | Bussing | 126—9 |
| 3,064,637 | 11/62 | Thomson | 126—9 |

JAMES W. WESTHAVER, *Primary Examiner.*